United States Patent [19]
Rush, II et al.

[11] Patent Number: 5,261,272
[45] Date of Patent: Nov. 16, 1993

[54] TEMPERATURE SENSOR FOR INTEGRATED INDUCTION SYSTEM

[75] Inventors: William B. Rush, II, Clarkston; Jack E. Elder, Rochester; Jerry B. Foss, Farmington Hills, all of Mich.

[73] Assignee: General Motors Corporation, Detroit, Mich.

[21] Appl. No.: 575,914

[22] Filed: Aug. 31, 1990

Related U.S. Application Data

[63] Continuation-in-part of Ser. No. 432,295, Nov. 6, 1989, Pat. No. 5,003,933.

[51] Int. Cl.$^5$ .......................................... G01M 19/00
[52] U.S. Cl. ..................................................... 73/118.2
[58] Field of Search ............... 73/118.1, 118.2, 204.21, 73/861.63

[56] References Cited

U.S. PATENT DOCUMENTS

| | | | |
|---|---|---|---|
| 3,374,673 | 3/1968 | Trageser | 73/204.21 |
| 4,074,566 | 2/1978 | Obayashi et al. | 73/18.2 |
| 4,083,244 | 4/1978 | Agar et al. | 73/204.21 |
| 4,363,238 | 12/1982 | Willam | 73/204.21 |
| 4,475,486 | 10/1984 | Kessler | 123/52 |
| 4,643,136 | 2/1987 | Ura et al. | 123/52 |
| 4,643,138 | 2/1987 | Ruf et al. | 123/52 M |
| 4,768,487 | 9/1988 | Yamamoto et al. | 123/470 |
| 4,805,564 | 2/1989 | Hudson, Jr. | 123/52 |
| 4,928,655 | 5/1990 | Kako | 73/118.2 |
| 5,005,535 | 4/1991 | Binversie et al. | 123/52 |
| 5,014,673 | 5/1991 | Fujimoto et al. | 123/512 |
| 5,018,486 | 5/1991 | Davis et al. | 123/52 |
| 5,094,194 | 3/1992 | Rush, II et al. | 123/52 |

FOREIGN PATENT DOCUMENTS

| | | | |
|---|---|---|---|
| 0095251A | 11/1983 | European Pat. Off. | |
| 503884 | 8/1989 | U.S.S.R. | 73/861.63 |

OTHER PUBLICATIONS

AC Rochester Division, General Motors Corporation; "1989 New Product Information", Publication No. 9D-1989; p. 2, 16–21, 23–25, 27–29, 46; 1988; Rochester, New York.

Great Britain Patent Office letter, dated Jan. 17, 1991 (attached search report search date, Jan. 5, 1991).

Suzuki Motor Company, Ltd.-manifold photographs, two copies.

*Primary Examiner*—Robert Raevis
*Attorney, Agent, or Firm*—Charles K. Veenstra

[57] ABSTRACT

An integrated induction system for providing fluids to the cylinders in an engine comprises a casing adapted for mounting on the engine. The casing has an air inlet and a plurality of fluid outlets. A plurality of air tubes are disposed within the casing so that air entering the air inlet flows through the air tubes and respective fluid outlets to the cylinders. Other fluid delivery systems, such as a fuel injection assembly, are mounted within the casing. A temperature sensor is also mounted within the casing.

5 Claims, 10 Drawing Sheets

TEMPERATURE SENSOR FOR INTEGRATED INDUCTION SYSTEM

This is a continuation-in-part of copending application Ser. No. 432,295 filed Nov. 6, 1989 and issued 2 Apr. 1991 as U.S. Pat. No. 5003933, and assigned to the same assignee.

TECHNICAL FIELD

This invention relates to a temperature sensor and, more particularly, to a temperature sensor for an integrated induction system for delivering fluids to the cylinders of an engine.

BACKGROUND

Intake manifolds commonly deliver air to the cylinders of an engine. Other fluids are typically delivered to the cylinders of an engine by systems connected to or separate from the intake manifold, such as fuel injection systems, exhaust gas recirculation systems, positive crankcase ventilation systems and fuel tank vapor systems. Fully coordinated control systems are often critical to the optimum functioning of the various fluid delivery systems, and other engine systems. The control systems typically require an accurate measurement of the temperature of the air in the intake manifold to properly control the operation of the various fluid delivery systems within the casing, and other engine systems.

SUMMARY OF THE INVENTION

The present invention provides a temperature sensor for an integrated induction system which contains in one assembly many of the components of the various fluid delivery systems of an engine.

The integrated induction system comprises a casing adapted for mounting on the engine. The casing has an air inlet and a plurality of fluid outlets. Each of the fluid outlets is adapted to communicate with a respective cylinder in the engine. A plurality of air tubes are disposed within the casing with the air tubes occupying a portion of the interior of the casing and the unoccupied portion of the casing constituting a plenum. The air tubes are positioned within the casing so that the plenum provides a flow path from the air inlet to the air tubes. One end of each of the air tubes opens from the plenum and the other end engages the casing adjacent one of the fluid outlets to allow communication between the plenum and the cylinders in the engine. Air entering into the plenum through the air inlet is thereby introduced via each of the air tubes into the respective cylinders. Other fluid delivery systems, such as a fuel injection assembly, are mounted within the casing. A temperature sensor is mounted within the casing to enable formation of an electric signal indicative of the temperature of the air in the casing, and provision of the electric signal to the systems which control the various fluid delivery systems within the casing, and other engine systems.

These and other features and advantages of the invention will be more fully understood from the following description of certain specific embodiments of the invention taken together with the accompanying drawings.

BRIEF DRAWING DESCRIPTION

In the drawings.

Corresponding reference characters indicate corresponding parts throughout the several views of the drawings.

DETAILED DESCRIPTION

Figure 11:
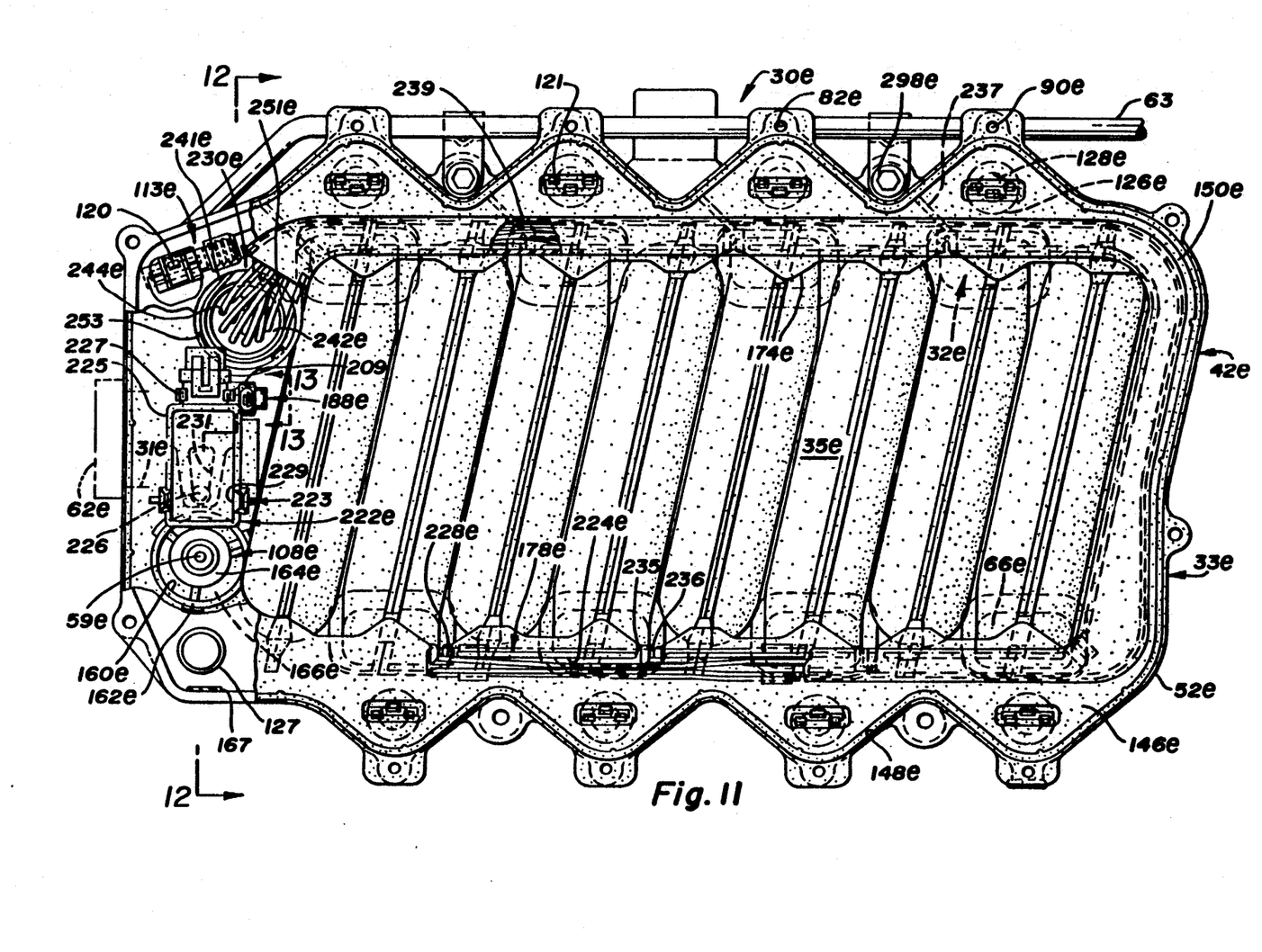
FIG. 11 is a plan view corresponding to FIG. 3 showing an alternative embodiment of the integrated induction system.
Figure 12:
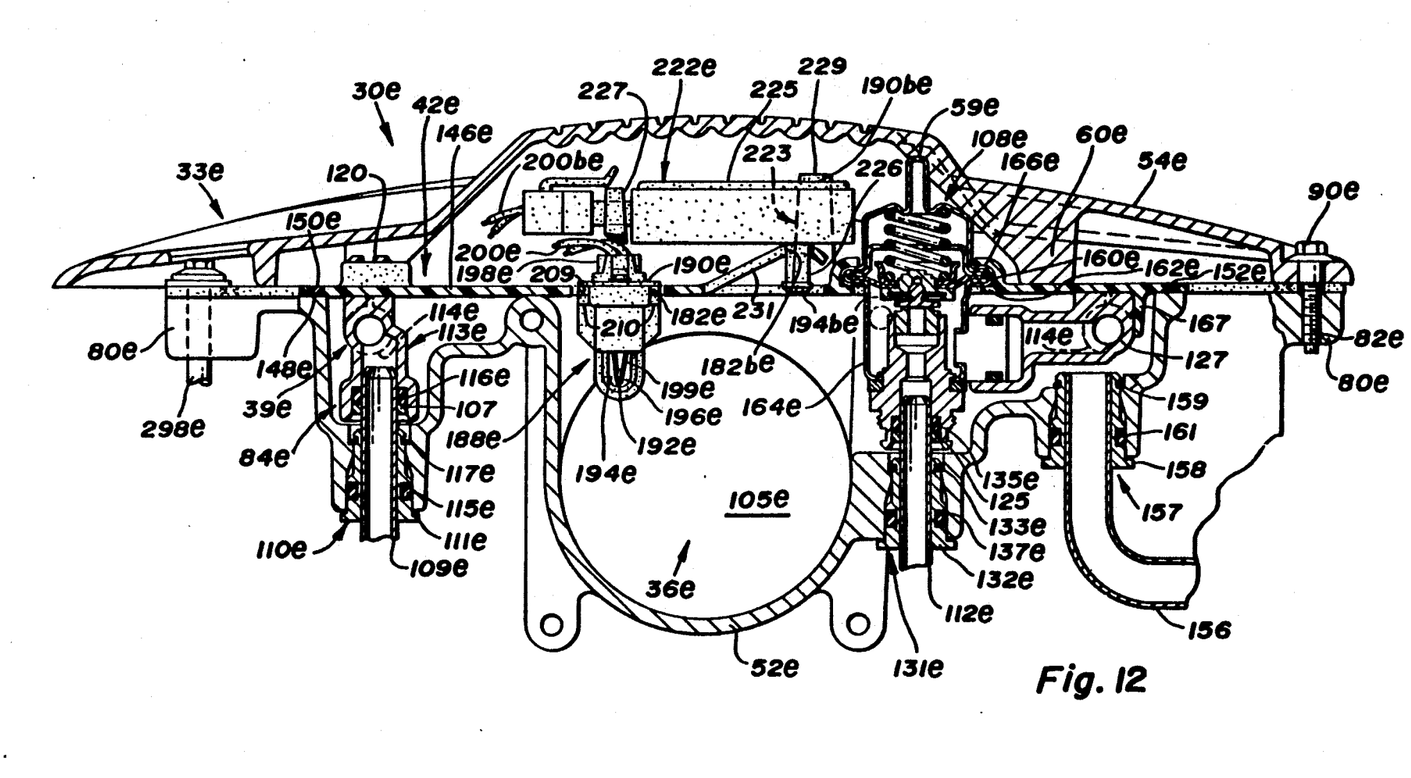
FIG. 12 is an enlarged sectional view generally in the plane indicated by line 12—12 of FIG. 11 showing some components connected to the carrier adjacent the air inlet.

Referring now to FIGS. 1, 2, 3 and 4 of the drawings, numeral 30 generally indicates an integrated induction system of the present invention to provide air, fuel and other fluids to the cylinders in the engine. An alternative embodiment of the integrated induction system 30e is shown in FIGS. 11 and 12. Parts similar to those shown in FIGS. 1, 2, 3 and 4 have the same reference numeral with the addition of the suffix e. Briefly, the integrated induction system 30 comprises a casing 33, a plurality of air tubes 35 disposed within the casing and a fuel injection assembly 39 mounted within the casing.

The casing 33 has an air inlet 31 enabling air to enter the casing and a plurality of fluid outlets 32 enabling fluids to exit the casing. The fluid outlets 32 are formed in the casing 33 so that, when the casing is mounted on the cylinder heads 37, each fluid outlet 32 communicates with a respective cylinder inlet 34.

The air tubes 35 occupy a portion of the interior volume of the casing 33 with the unoccupied portion of the casing constituting a plenum 36. The air tubes 35 are positioned in the casing 33 so that the plenum 36 provides a flow path from the air inlet 31 to the air tubes. One end of each air tube 35, constituting the air tube inlet 38, opens from the plenum 36. The other end of the air tube 35, constituting the air tube outlet 40, engages the casing 33 adjacent a respective fluid outlet 32 to allow communication between the plenum 36 and a respective cylinder. Air entering into the plenum 36 through the air inlet 31 is thereby introduced via each of the air tubes 35 into the respective cylinders.

The fuel injection assembly 39 includes a fuel injector 41 directed toward each fluid outlet 32. The fuel injectors 41 inject fuel into the air exiting the air tubes 35 adjacent the fluid outlets 32 to cause a mixture of air and fuel to enter the respective cylinders. The integrated induction system 30 also includes a carrier 42 connected to the fuel injection assembly 39 and other components contained within the casing 33.

The casing 33 may be supported on distribution mountings 44 disposed between it and the cylinder heads 37. Each distribution mounting 44 has mounting passages 48 which allow communication between the casing and cylinders to enable the air and fuel inside the casing to enter the cylinders.

Casing

Figure 1:
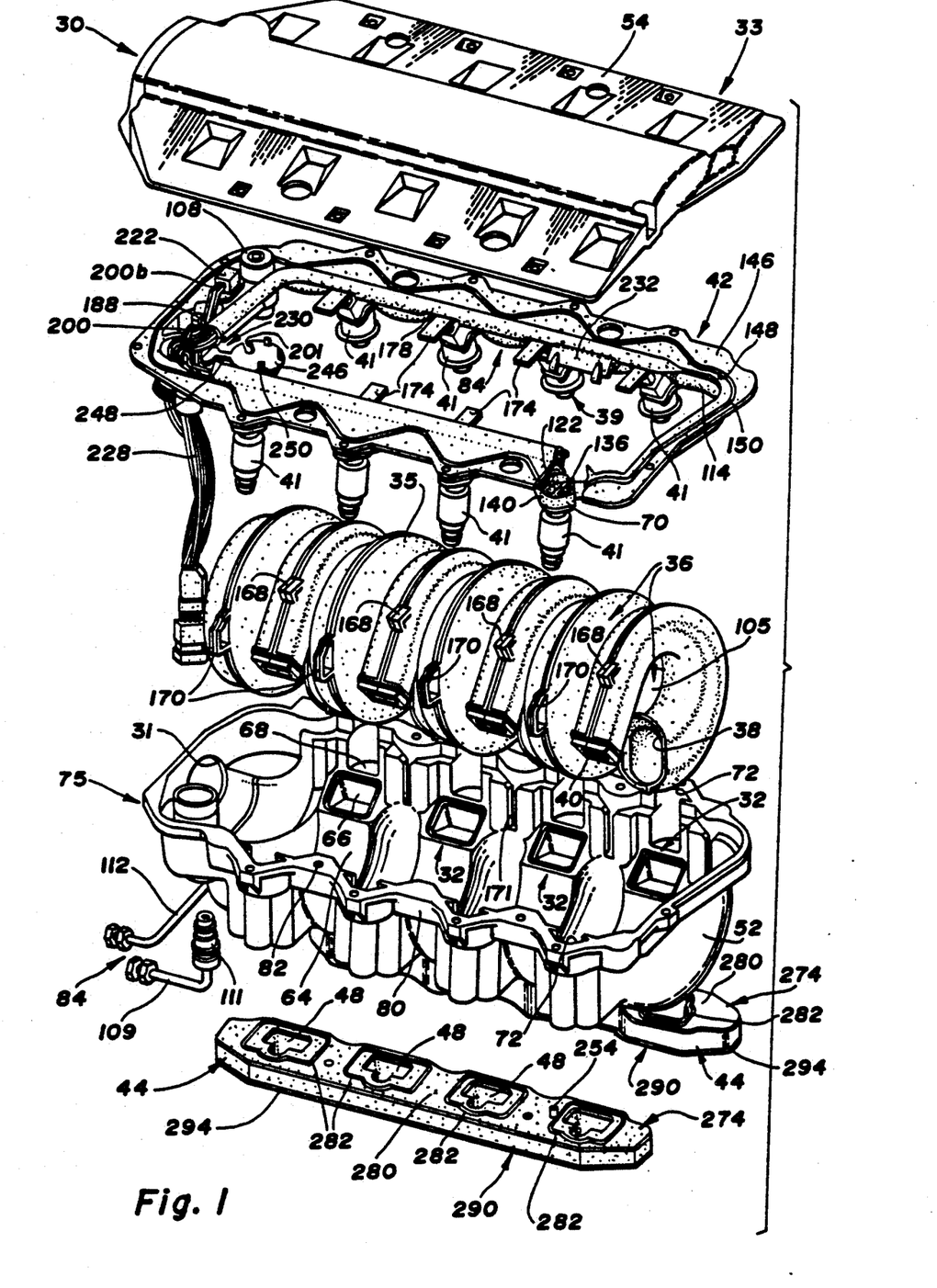
FIG. 1 is an exploded view of an integrated induction system in accordance with the present invention.
Figure 2:
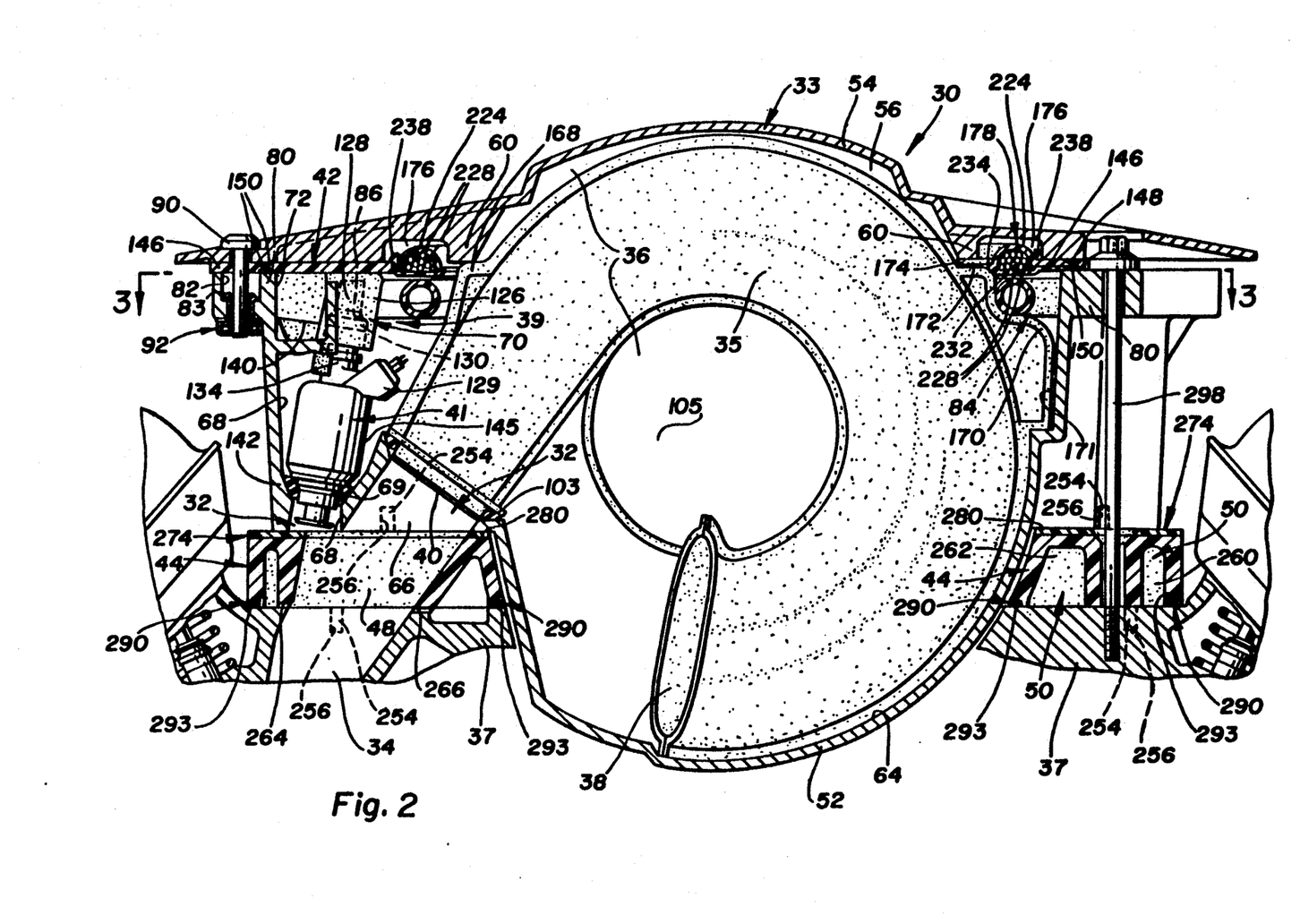
FIG. 2 is an enlarged transverse sectional view of the integrated induction system of FIG. 1 generally in a plane between air tubes showing some components in assembly.

As shown in FIGS. 1 and 2, the casing 33 comprises an enclosure defined by a shell 52 and a cover 54. The cover 54 is removable to provide access to the interior of the casing 33.

As shown in FIG. 1, the shell 52 has an air inlet 31 comprising an opening formed in one end of the shell adjacent its top. The outer surface of the shell 52 adjacent the air inlet 31 is flat to enable a throttle body 62, shown in FIG. 3, or other air metering device to be mounted on it to regulate the flow of air into the casing 33.

As shown in FIGS. 1 and 2, the shell 52 has fluid outlets 32 comprising openings formed in the bottom of the shell adjacent its sides. The fluid outlets 32 mate with respective mounting passages 48 to allow communication between the inside of the casing 33 and the cylinders. The inner rows of fluid outlets 32 allow communication between the air tubes 35 and the cylinders and constitute the air outlets 66. The outer rows of fluid outlets 32 allow communication between the fuel injectors 41 and the cylinders and are constituted by openings in injector seats 68. The injector seats 68 are cup shaped to support the outlet of each fuel injector 41 mounted within it so that fuel can exit the fuel injector and flow through the opening in the seat base 69 toward the cylinder inlet 34e.

As shown in FIG. 1, a casing flange 80 is formed in the sides of the shell 52 adjacent its upper edge to serve as a mounting for the cover 54. As shown in FIGS. 1 and 2, each casing flange 80 has a plurality of connecting bores 82. Each connecting bore 82 has an enlarged upper portion, producing a step 83 for connection of a spring clip 92. Threaded connecting bolts 90 extend through openings in the cover 54 into each connecting bore 82. The spring clip 92 has internal threads corresponding to the external threads on the connecting bolts 90. This enables each connecting bolt 90 to be screwed into a respective spring clip 92 adjacent the casing flange 80 to hold the cover 54 against the shell 52.

Air Tubes

As shown in FIGS. 1 and 2, the air tubes 35 are located inside the casing 33 with the individual air tubes in side-to-side relation with respect to one another. The air tubes 35 are arranged so that their centers of curvature are approximately collinear. The inner curves of the air tubes 35 thereby define a cylindrical region constituting the principal portion 105 of the plenum 36.

Fuel Injection Assembly

The fuel injection assembly 39 shown in FIGS. 1, 2, 3 and 4 includes the fuel injectors 41 and a fuel distribution assembly 84 which connects the fuel injectors and allows fuel to flow to each of them. The fuel distribution assembly 84 includes an injector pod 70 connected to each fuel injector 41 and fuel tubes 114 which serially connect the fuel injectors. Each injector pod 70 has a hollow injector mounting 126 as shown in FIG. 2. The injector mounting 126 includes an integral injector socket 128 with a cross section which is larger than the cross section of the inlet of the fuel injector 41 so that a fuel injector can be inserted into the socket.

Each injector pod 70 has an integral tubular inlet projection 122 extending away from the injector mounting 126. The inlet projection 122 registers with an inlet 123 on the injector mounting 126 to allow fuel to flow through the inlet projection into the injector socket 128 to supply the fuel injector 41 retained in it. The inlet projection 122 is inserted into the resilient opening in one end of a fuel tube 114.

Each injector pod 70 has an integral tubular outlet projection 136 extending away from the injector mounting 126. The outlet projection 136 registers with an outlet 139 on the injector mounting 126 to allow excess fuel to be discharged from it through the outlet projection. The outlet projection 136 is inserted into the resilient opening in the end of another fuel tube 114.

The construction of the injector pods 70 and their connection to the fuel tubes 114 allows fuel to flow through the fuel tubes 114 into each injector pod 70 to supply the respective fuel injector 41 connected to it. The portion of the fuel in each injector pod 70 which does not flow into the associated fuel injector 41 is discharged from the injector pod and allowed to supply the adjacent injector pod. Fuel is thereby able to flow through the string of connected fuel injectors 41 to serially supply each of them.

The fuel distribution assembly 84 includes a stainless steel fuel inlet tube 109 which extends through an opening in the shell 52 and a fuel inlet connector 110. The end of the fuel inlet tube 109 outside the casing 33 is connected to a fuel source and the other end is connected, via the fuel inlet connector 110, to the inlet of the string of connected fuel injectors 41. Fuel is thereby able to flow from the fuel source into the fuel injectors 41.

Figure 3:
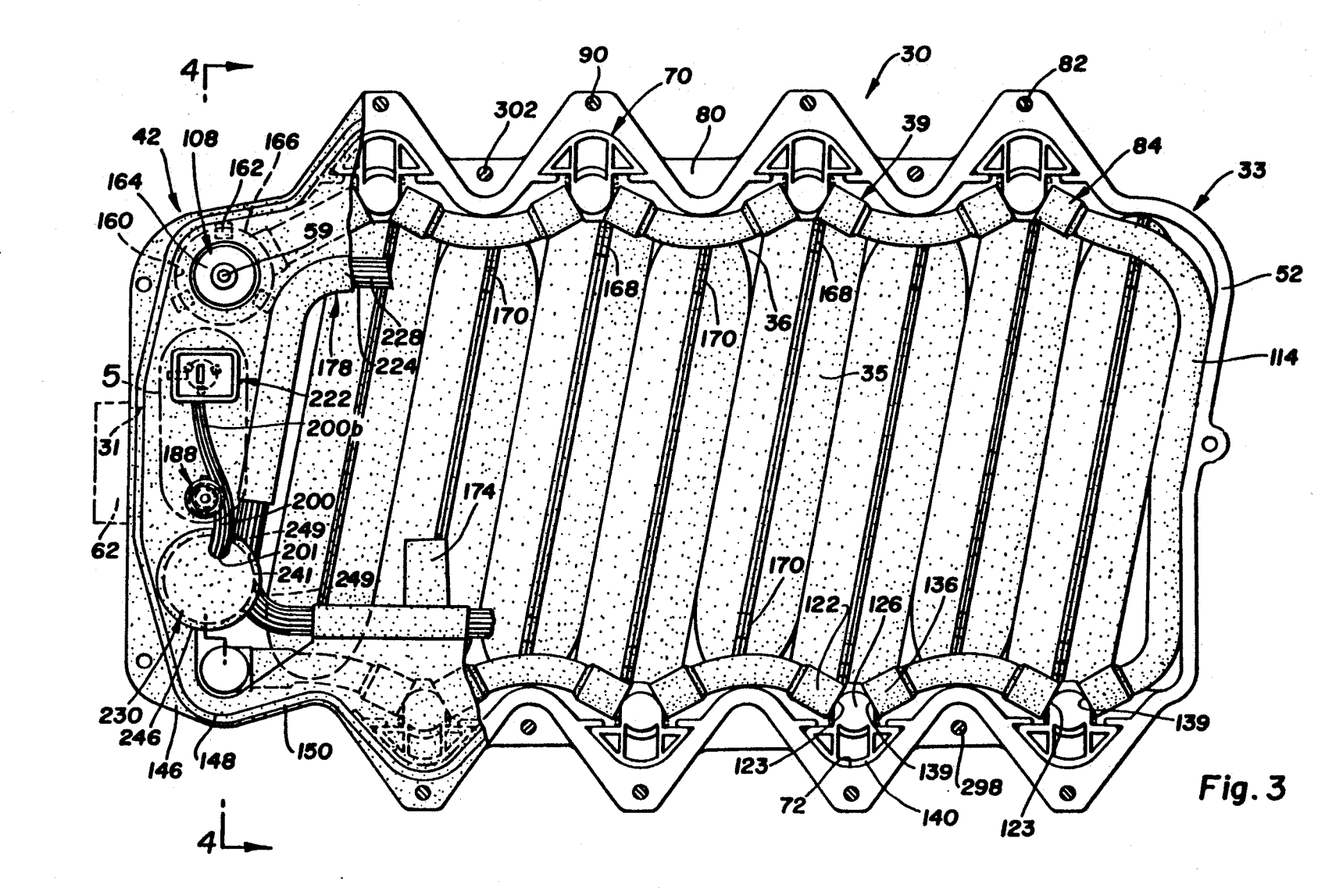
FIG. 3 is a plan view in the plane indicated by line 3—3 of FIG. 2 with the cover removed and part of the carrier being broken away showing some components in assembly.
Figure 4:
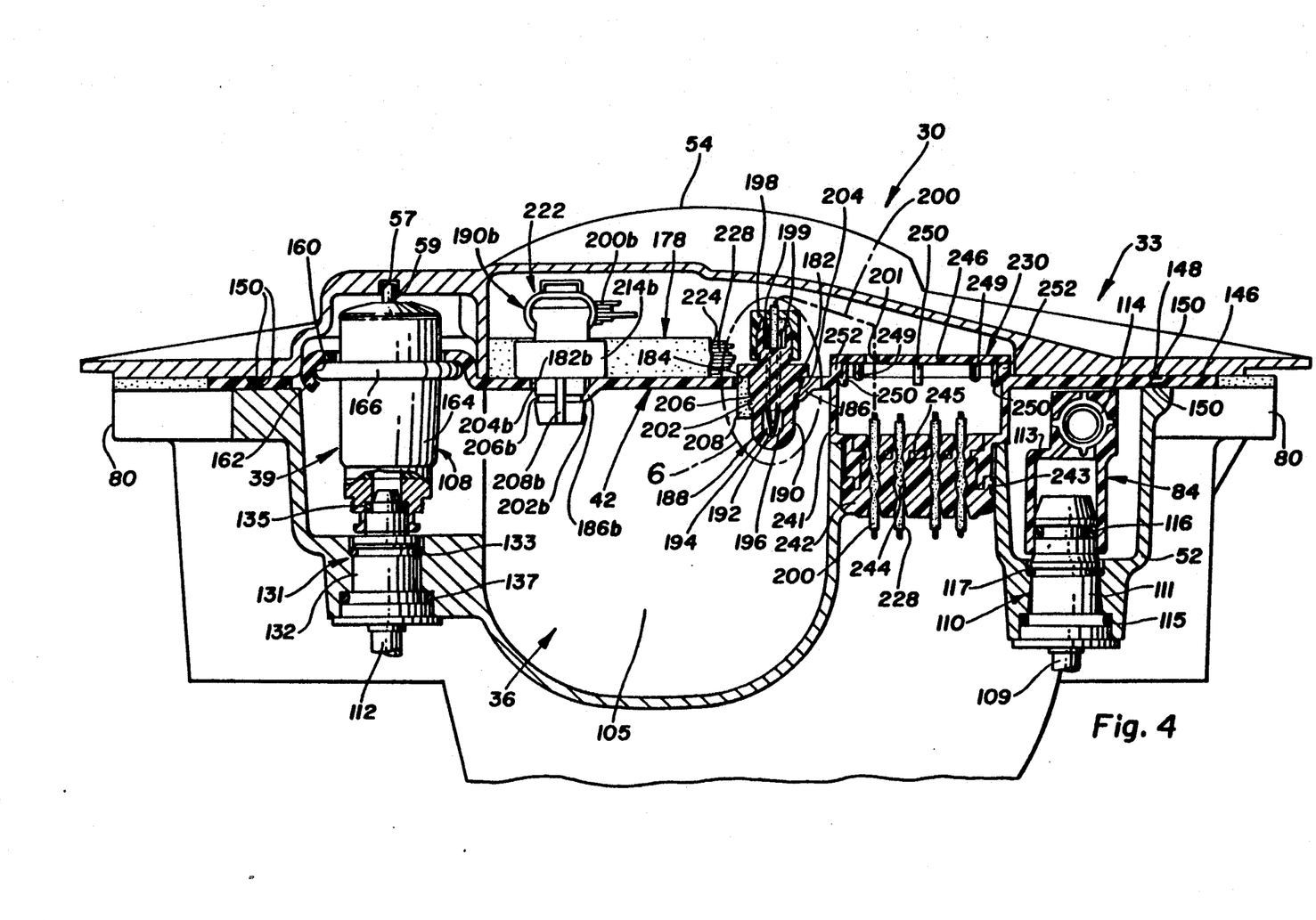
FIG. 4 is an enlarged sectional view generally in the plane indicated by line 4—4 of FIG. 3 showing some components connected to the carrier adjacent the air inlet.

As shown in FIGS. 3 and 4, the fuel distribution assembly 84 includes the fuel pressure regulator 108 having an inlet connected to the outlet of the string of connected fuel injectors 41. The fuel distribution assembly 84e may also include a regulator inlet connector 127 having an 0-ring for connecting the outlet of the string of connected fuel injectors 41e to the fuel pressure regulator 108e.

The fuel distribution assembly 84 also includes a fuel outlet connector 131 which enables connection of the outlet of the fuel pressure regulator 108 to one end of a stainless steel fuel outlet tube 112. The fuel outlet tube 112 extends outside the casing 33 through an opening in the shell 52. The other end of the fuel outlet tube 112 is connected to a fuel tank outside the casing 33. Fuel is thereby able to flow out of the string of connected fuel injectors 41, through the fuel pressure regulator 108 and the fuel outlet tube 112 to the fuel tank.

Carrier

As shown in FIGS. 1, 2, 3 and 4, the carrier 42 comprises a continuous flat base strip 146 disposed between the cover 54 and the casing flange 80. The base strip 146 is releasably connected to the interior of the casing 33 above the injector seats 68 by being clamped between the cover 54 and the casing flange 80.

Figure 5:
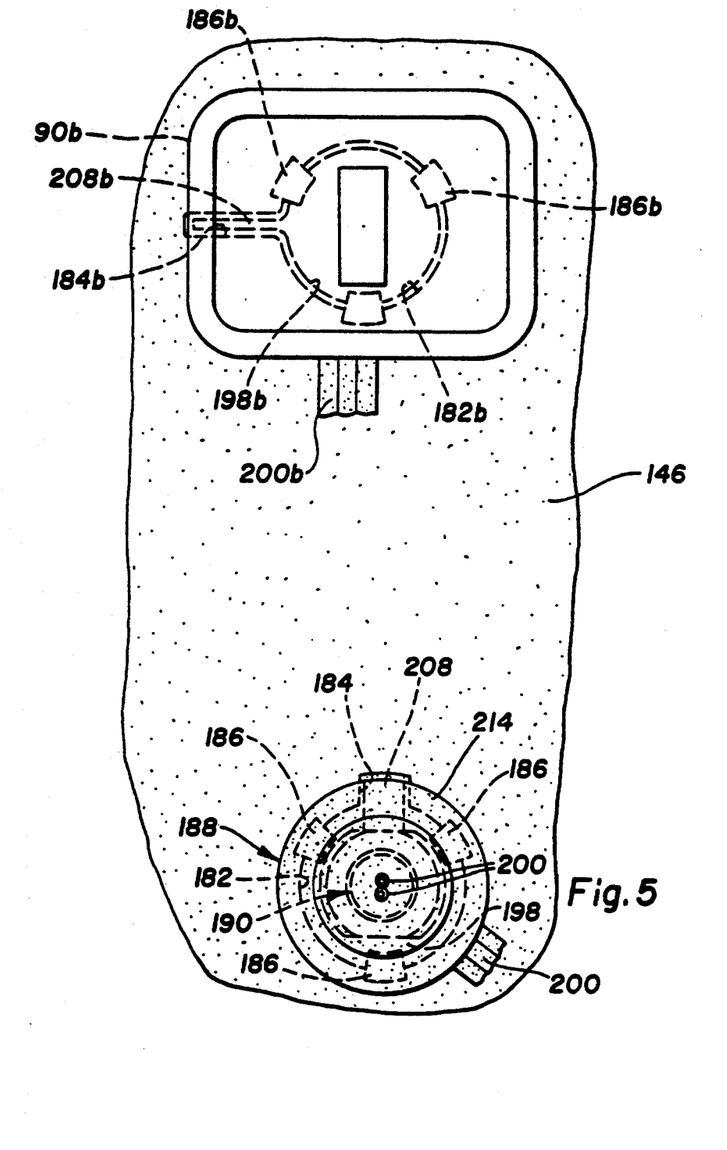
FIG. 5 is an enlarged view of circled portion 5 of FIG. 3 showing the connection between the temperature sensor, pressure sensor and carrier.

As shown in FIGS. 3, 4 and 5, the base strip 146 has a circular component opening 182 adjacent the air inlet 31 and a component keyway 184 contiguous with the component opening 182. A clasp comprising three equally spaced integral resilient detents 186 extends from the lower surface of the base strip 146 into the component opening 182 at an angle to the base strip.

Figures 6, 7, 8:
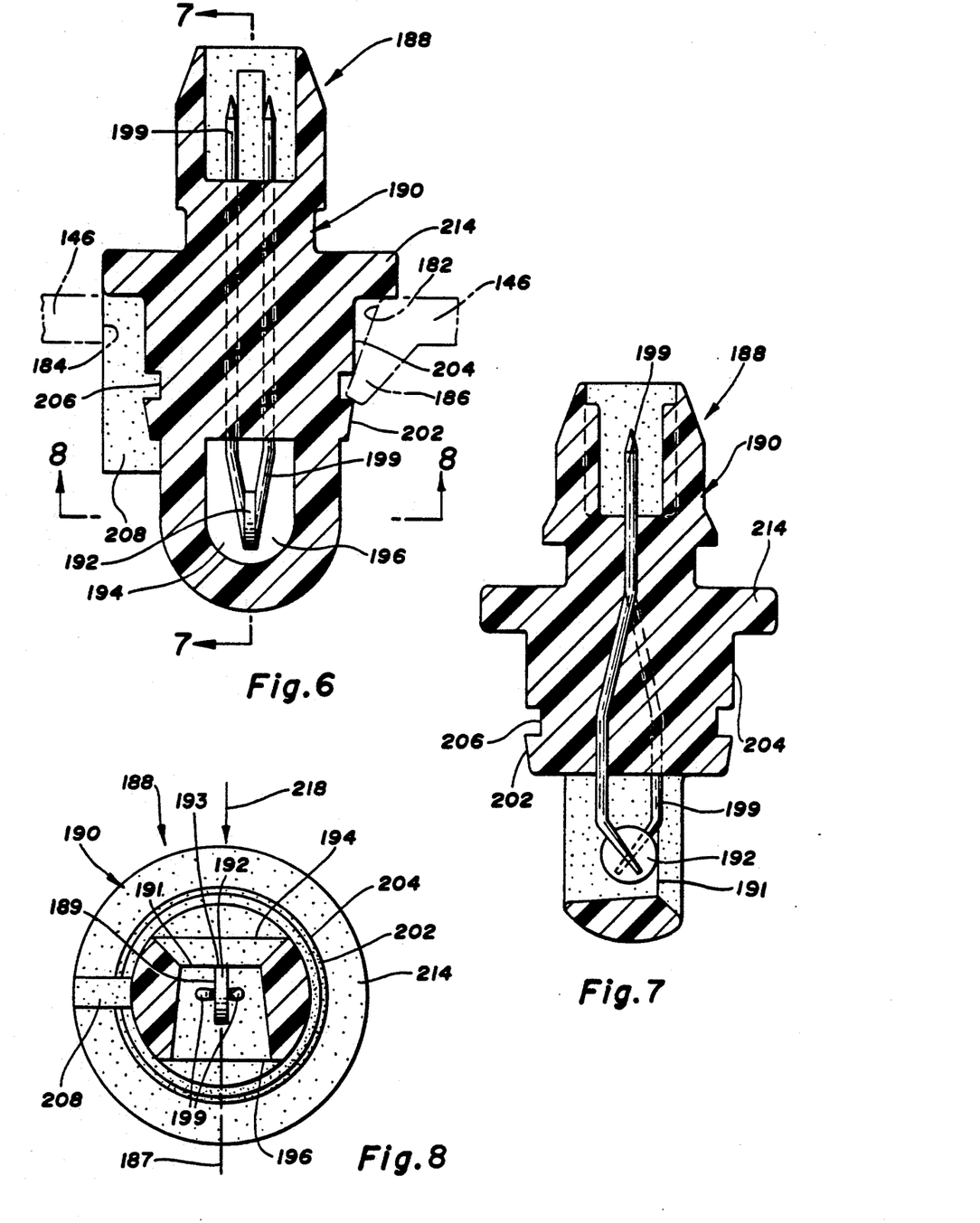
FIG. 6 is an enlarged view of the temperature sensor (in solid lines) and portions of the carrier (in phantom) contained within the circled portion 6 of FIG. 4.
FIG. 7 is a cross-sectional view of the temperature sensor generally in the plane indicated by line 7—7 of FIG. 6.
FIG. 8 is a cross-sectional view of the temperature sensor generally in the plane indicated by line 8—8 of FIG. 6.

A temperature sensor 188, shown in detail in FIGS. 6, 7 and 8 comprises a cylindrical sensor housing 190, extending downward through the component opening 182. The sensor housing 190 is constructed of glass filled polyester. A thermistor 192 which produces a non-linear variable electric resistance inversely proportional to its temperature is disposed within the sensor housing 190. The thermistor 192 comprises a plate-shaped member having parallel thermistor faces 189 and a thermistor edge 193 which is perpendicular to the thermistor faces. The thermistor 192 may have a low weight to reduce its thermal inertia resulting in improved responsiveness of the thermistor.

The sensor housing 190 has a housing inlet 194 which faces the air inlet 31 so that a portion of the air or fluid entering the casing 33 through the air inlet flows through the housing inlet in the direction 218 into the sensor housing 190, as shown in FIG. 8. The air flows through a passageway having a passageway axis 187 - - -, in the sensor housing 190 and exits through a housing outlet 196. The passageway has a vortex producing means comprising a converging portion 195 adjacent the housing inlet 194. The passageway also has a diverging portion 197 adjacent the housing outlet 196, with an edge 191 being formed between the converging and diverging portions 195, 197. The combination of the converging and diverging portions 195, 197 constitutes a velocity increasing means. Passage of the air flow by the edge 191 results in the formation of vortices in the air flow downstream of the edge 191. The diverging portion 197 produces an increase in the air flow velocity through the passageway adjacent the edge 191. The thermistor 192 is positioned in the passageway adjacent the edge 191 and downstream of the converging portion 195 with the thermistor faces 189 being parallel to the passageway axis 187 to maximize the velocity of the air flow adjacent the thermistor and to maximize the impingement of the vortices on the thermistor faces 189. The increased air flow turbulence produced by the vortices and the increased air flow velocity adjacent the thermistor 192 increases its responsiveness and accuracy. The velocity of the air entering the casing 33 through the air inlet 31 may be sufficiently high to further increase the velocity of the air in the passageway.

The top of the sensor housing 190 has an integral flange 214 which rests on the base strip 146. An electrical connector 198 is attached to the top of the sensor housing 190. Leads 199 are soldered to the thermistor 192 and extend through the sensor housing 190 into the electrical connector 198, as shown in FIG. 4. Sensor wires 200 of a wiring harness 230 extend from the leads 199 out of the electrical connector 198.

lower end of the sensor housing 190 has a circular, approximately constant cross section which is smaller than the component opening 182 to allow downward insertion of the sensor housing into it. As shown in FIGS. 6, 7 and 8, the sensor housing 190 has a frustoconical portion 202 above the housing inlet and outlet 194, 196. The frustoconical portion 202 facilitates coaxial alignment of the sensor housing 190 with the component opening 182 as it is inserted downward into the component opening. The sensor housing 190 has a cylindrical enlarged portion 204 above the frustoconical portion 202 having a circular cross section smaller than the component opening 182 but sufficiently large to engage the resilient detents 186 when the sensor housing is inserted into the component opening. The enlarged portion 204 has a cylindrical recess 206 so that, when the enlarged portion is inserted into the component opening 182, the ends of the detents 186 enter the recess to releasably retain the sensor housing 190 in the component opening. The sensor housing 190 can be removed by pulling it upward out of the component opening 182 causing the ends of the detents 186 to exit the recess 206.

The sensor housing 190 has an integral longitudinal key 208 extending from its outer surface. When the sensor housing 190 is inserted into the component opening 182 with the housing inlet 194 facing the air inlet 31, the key 208 enters the component keyway 184 to prevent rotation of the sensor housing with respect to the base strip 146. The key 208 is located on the sensor housing 190 so that, when it is inserted into the keyway 184, the thermistor 192 is properly aligned with respect to the base strip 146.

Figure 9:
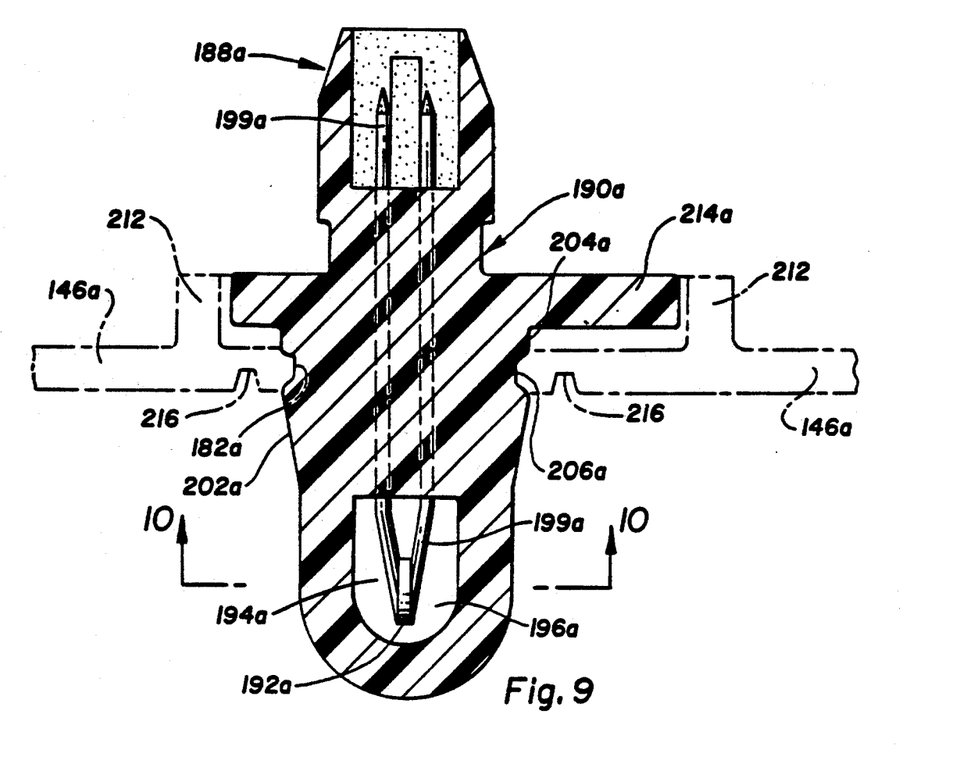
FIG. 9 is an enlarged view corresponding to FIG. 6 showing a second embodiment of the temperature sensor (in solid lines) and portions of a second embodiment of the carrier (in phantom)
Figure 10:
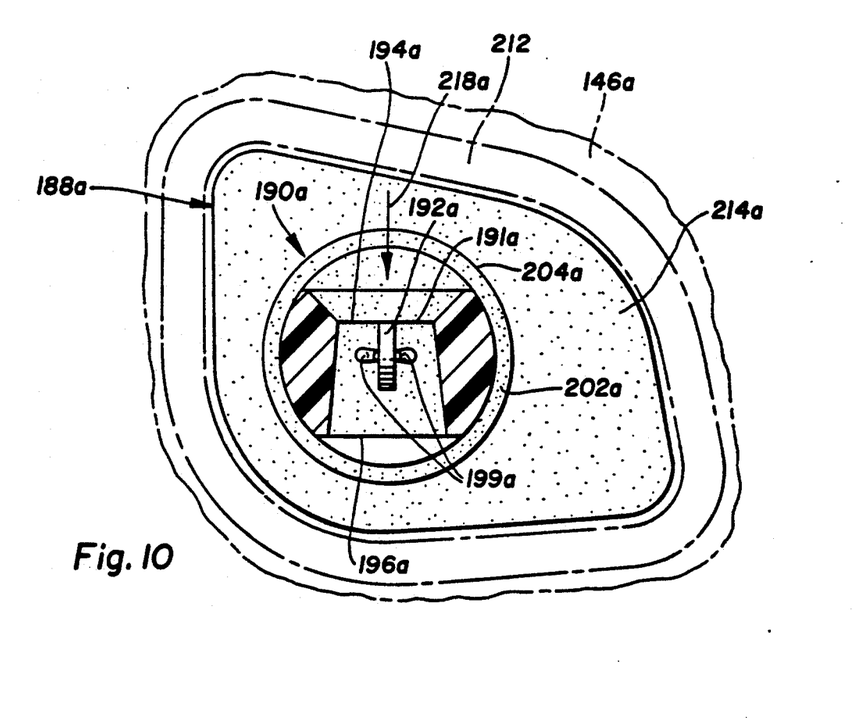
FIG. 10 is an enlarged cross-sectional view of the second embodiment of the temperature sensor generally in the plane indicated by line 10—10 of FIG. 9.

An alternative embodiment of the sensor housing 190 is shown in FIGS. 9 and 10. The construction of the alternative sensor housing 190a and carrier 42a corresponds to the sensor housing 190 and carrier 42 except for the modifications described below. Similar parts are identified by the same reference numerals as those used for the temperature sensor 188 with the addition of the suffix a. The detents 186 and component keyway 184 are removed from the base strip 146a. A continuous ridge 212 is formed on the upper surface of the base strip 146a with the component opening 182a being offset inside the ridge.

The sensor housing 190a includes an integral support flange 214 having a perimeter which corresponds in shape to the inner edge of the ridge 212 so that, when the sensor housing is inserted into the component opening 182a with the housing inlet 194a facing the air inlet 31, the flange fits inside the ridge to align the sensor housing with respect to the base strip 146a. The enlarged portion 204a of the sensor housing 190a has a circular cross section larger than the component opening 182a and a cylindrical recess 206a with an inner dimension corresponding to the edge of the component opening. The base strip 146a or the enlarged portion 204a is resilient so that, when it is inserted into the component opening 182a, the edge of the component opening enters the recess 206a to fasten the sensor housing 190a to the base strip. The base strip 146a may have a cylindrical recess 216 adjacent the edge of the component opening 182a to facilitate deflection of the edge when the enlarged portion 204a is inserted into the component opening.

A sensor housing may also alternatively be inserted into a semicircular recess formed in an edge of a base strip similar to base strip 146. The recess is slightly smaller than the sensor housing and either the base strip or sensor housing is resilient to allow the sensor housing to be inserted into the recess and held in it. The sensor housing has indentations into which the edges of the recess enter to prevent upward or downward displacement of the sensor housing with respect to the base strip. The sensor housing also has a pair of longitudinal keys which engage the edge of the base strip when the sensor housing is inserted into the recess to prevent rotation of the sensor housing with respect to it. The keys are located on the sensor housing so that, when they engage the base strip, the sensor within the housing is properly aligned with respect to the base strip.

Figures 13, 14, 15, 16:
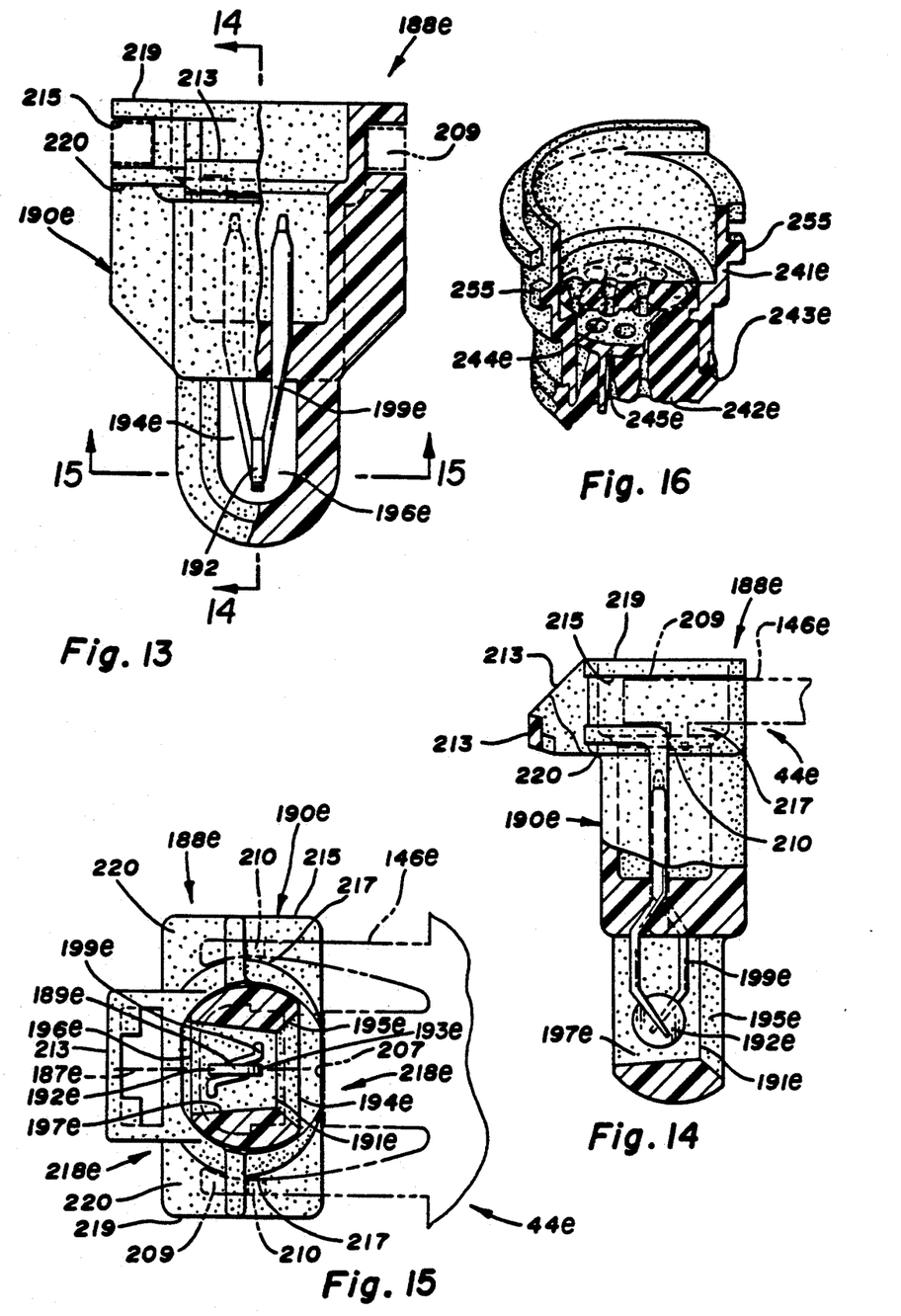
FIG. 13 is an enlarged partial sectional view generally in the plane indicated by line 13—13 of FIG. 12 showing the temperature sensor (in solid lines) and portions of the carrier (in phantom)
FIG. 14 is a partial cross-sectional view of the temperature sensor generally in the plane indicated by line 14—14 of FIG. 13.
FIG. 15 is a cross-sectional view of the temperature sensor generally in the plane indicated by line 15—15 of FIG. 13.
FIG. 16 is an enlarged perspective view of the wiring harness housing of FIG. 11.

FIGS. 13-15 show an example of such a sensor housing. The construction of the sensor housing 190 e and carrier 42 e corresponds to the sensor housing 190 and carrier 42 except for the modifications described below. Similar parts are identified by the same reference numerals as those used for the temperature sensor 188 with the addition of the suffix e. The sensor housing 190e has a thermistor 192e in a passageway extending between a housing inlet and outlet 194e, 196e. The sensor housing 190e has a pair of support flanges 219, 220 which define indentations or sensor slots 215. The support flanges 219, 220 have different lengths so that each sensor slot 215 has a sensor notch 217. The sensor housing 190e has a connector keeper 213 above the housing outlet 196e. An electrical connector 198e can be attached to the connector keeper 213 with the leads 199e being in electrical contact with the electrical connector.

The base strip 146e has a pair of resilient carrier tangs 209 extending from an interior edge of the base strip. The carrier tangs 209 define a semicircular recess, and are adapted to grasp the sensor housing 190e when the sensor housing is inserted between the carrier tangs. Each carrier tang 209 has a tang stop 210 extending downward adjacent the end of the carrier tang. A carrier stop 207 extends from an interior edge of the base strip 146e between the carrier tangs 209.

The sensor housing 190e is connected to the base strip 146e by inserting the sensor housing between the carrier tangs 209 with each carrier tang entering a sensor slot 215 and each tang stop 210 entering a sensor notch 217. The carrier tangs 209 grasp the sensor housing 190e with the enlarged ends of the carrier tangs wrapping around the portion of the sensor housing above the housing outlet 196e to resist removal of the sensor housing from between the carrier tangs. The support flanges 219, 220 obstruct displacement of the sensor housing 190e with respect to the base strip 146e in a plane perpendicular to the base strip. When the sensor housing 190e is connected to the base strip 146e in the predetermined orientation, the housing inlet 194e faces a carrier stop 207. Also, each of the tang stops 210 engage a respective stop flange 220 on opposite sides of the sensor housing 190e to obstruct rotation of the sensor housing with respect to the base strip 146e. The stop flanges 220 may therefore be considered as longitudinal keys which engage the base strip 146e to obstruct such rotation. When the sensor housing 190e is not in the predetermined orientation, the tang stops 210 engage the stop flanges 219, 220 when the carrier tangs 209 enter the sensor slots 215 to limit the portion of the carrier tangs which enter the sensor slots thereby obstructing the grasping.

As shown in FIGS. 1, 3 and 4, the wiring harness 230 includes a wiring harness housing 241 integral with the base strip 146 next to the air inlet 31. The wiring harness housing 241 is cylindrical and is inserted into an opening in the shell 52. The wiring harness housing 241 has notches 249 shown in FIGS. 3 and 4 adjacent its upper edge to allow the control wires 228 to extend into it from the interior of the casing 33. The interior of the wiring harness housing 241 has an integral cylindrical partition 245 with support ribs depending from its lower surface.

The wiring harness housing 241e may also be detachable from the base strip 146e. As shown in FIG. 11, the base strip 146e has a harness opening 251 and three circumferential harness sockets formed in the base strip adjacent the harness opening. As shown in FIG. 16, the wiring harness housing 241e has three radial housing tabs 255 extending from its outer surface which interlock with the three harness sockets. Radial carrier gaps 257 are provided between the harness sockets so that the wiring harness housing 241e can be downwardly inserted into the harness opening 251 with the housing tabs 255 passing through the carrier gaps. The wiring harness housing 241e is then rotated with respect to the harness opening 251 so that the housing tabs 255 enter the harness sockets and interlock therewith to hold the wiring harness housing 241e to the base strip 146e.

The wiring harness 230 includes a harness cap 246 shown in FIG. 1 connected to the wiring harness housing 241 by a harness hinge 248. The harness hinge 248 is formed by a thin flexible web connecting the edge of the harness cap 246 to the upper edge of the wiring harness housing 241. The harness cap 246 is thereby able to swing between an open position wherein the sensor wires 200 may be inserted into the wiring harness housing 241 and a closed position. The harness cap 246 has a notch 201 allowing the sensor wires 200 to extend into the wiring harness housing 241 with the harness cap in the closed position.

The harness cap 246 has a plurality of integral latches 250 shown in FIGS. 1 and 4 which releasably engage a cylindrical ridge 252 on the inner surface of the wiring harness housing 241 when the harness cap is in the closed position, as shown in FIG. 4. Each latch 250 comprises a resilient arm projecting downward into the wiring harness housing 241 from the bottom of the harness cap 246 when the cap is in the closed position and a finger projecting radially outward. The arrangement is such that when the harness cap 246 is swung to the closed position, the latch 250 moves downwardly into the wiring harness housing 241 causing the finger to engage the ridge 252. Continued downward insertion of the latch 250 causes the finger to move inward, clear the ridge 252 and spring outward to a position below the ridge, thereby holding the harness cap 246 in the closed position. The harness cap 246 may be released from the closed position by forcibly pulling it upward to cause the finger of the latch 250 to move inward to a point where it clears the ridge 252. It is possible for the wiring harness 230e to lack a harness cap as shown in FIG. 11.

The wiring harness 230 includes a cylindrical sealing body 242 constructed of absorbent silicone rubber impregnated with silicone fluid. The sealing body 242 is molded inside the wiring harness housing 241 on each side of the partition 245, as shown in FIG. 4, with the partition 245 providing support to the sealing body 242. The sealing body 242 extends downward out of the wiring harness housing and radially outward adjacent the opening in the shell 52. The sealing body 242 has cylindrical beads 243 on its outer surface which are compressed when the sealing body is inserted into the opening in the shell 52 to provide a seal between the sealing body and the shell. FIG. 16 illustrates the sealing body 242e and partition 245e in the embodiment of the wiring harness 230e which is detachable from the base strip 146e.

Harness outlets 244 extend through the sealing body 242 and openings in the partition 245. The diameter of each harness outlet 244 is smaller than the sensor wires 200 which extend through it. This enables the walls of the respective harness outlet 244 to compressively or sealingly engage the sensor wires 200 extending through it to provide a seal between them. The silicone fluid in the sealing body 242 facilitates insertion of the sensor wires 200 into the respective harness outlets 244.

The sensor wires 200 extend downward out of the wiring harness housing 241 and casing 33 to an engine control module. The engine control module measures the electric signals produced by the temperature sensor 188 which can be correlated to the temperature of the air entering the casing 24 through the air inlet 31. The electric signals produced by the temperature sensor 118 also affect the regulation of the engine operation by the engine control module.

Alternatively, the wiring harness housing 241 and sealing body 242 may be replaced by a multiple wire connector. The sensor wires 200 would then extend from inside the casing 33 to the multiple wire connector which would be sealingly retained in an opening in the casing in a similar manner as the wiring harness 230. A corresponding connector would be connected to the outer face of the multiple wire connector to electrically connect each of the sensor wires 200 to a corresponding wire outside the casing 33 leading to the engine control module.

The sensor wires 200e may also collectively extend through the wiring harness 230e to a single cylindrical multiple wire connector located outside the casing 33e. The single multiple wire connector has a separate lead corresponding to each sensor wire 200e. A corresponding connector is attached to the multiple wire connector to electrically connect the sensor wires 200e to the engine control module. The engine control module controls the operation of the various fluid delivery systems within the casing 33, and other engine systems.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A temperature sensor for an intake manifold comprising: a sensor housing including a passageway having a passageway axis, a housing inlet, a housing outlet and a vortex producing means, said sensor housing being adapted for location inside the intake manifold so that when said sensor housing is located in the intake manifold, a portion of the fluid entering the intake manifold flows into said passageway through said housing outlet; and a thermistor comprising a plate-shaped member having parallel thermistor faces and a thermistor 2. A temperature sensor as set forth in claim 1 wherein said vortex producing means comprises a converging portion formed between said housing inlet and outlet, said converging portion being adjacent to said housing inlet and substantially all of said converging portion being upstream of said thermistor.

3. A temperature sensor as set forth in claim 2 wherein said sensor housing further comprises a diverging portion adjacent to said housing outlet, said thermistor being located adjacent to said converging and diverging portions.

4. A temperature sensor as set forth in claim 3 wherein said converging and diverging portions are adjacent to one another so that an edge is formed between them, said edge being positioned adjacent to said thermistor, substantially all of said converging portion being upstream of said thermistor.

5. A temperature sensor as set forth in claim 1 wherein said sensor housing is mounted within an intake manifold having an air inlet so that said housing inlet is adjacent to and faces said air inlet.

* * * * *